US00RE42434E

(19) United States
(12) Reissued Patent
Fronk et al.

(10) Patent Number: US RE42,434 E
(45) Date of Reissued Patent: Jun. 7, 2011

(54) CORROSION RESISTANT PEM FUEL CELL

(75) Inventors: Matthew Howard Fronk, Honeoye Falls, NY (US); Rodney Lynn Borup, East Rochester, NY (US); Jay S. Hulett, Rochester, NY (US); Brian K. Brady, North Chili, NY (US); Kevin M. Cunningham, Romeo, MI (US)

(73) Assignee: GM Global Technology Operations LLC, Detroit, MI (US)

(21) Appl. No.: 10/720,005

(22) Filed: Nov. 21, 2003

Related U.S. Patent Documents

Reissue of:

(64) Patent No.: 6,372,376
Issued: Apr. 16, 2002
Appl. No.: 09/456,478
Filed: Dec. 7, 1999

(51) Int. Cl.
*H01M 4/86* (2006.01)
*H01M 2/14* (2006.01)

(52) U.S. Cl. ..... 429/529; 429/522; 429/530; 429/532; 429/479

(58) Field of Classification Search ..... 429/522, 429/529, 530, 532, 479
See application file for complete search history.

(56) References Cited

U.S. PATENT DOCUMENTS

| | | | | |
|---|---|---|---|---|
| 5,272,017 | A | 12/1993 | Swathirajan et al. | 429/33 |
| 5,578,388 | A * | 11/1996 | Faita et al. | 429/437 |
| 5,728,283 | A * | 3/1998 | Reuter et al. | 204/499 |
| 5,798,188 | A * | 8/1998 | Mukohyama et al. | 429/480 |
| 5,952,118 | A * | 9/1999 | Ledjeff et al. | 429/434 |

FOREIGN PATENT DOCUMENTS

| | | |
|---|---|---|
| EP | 0360219 | 9/1989 |
| EP | 0780916 | 11/1996 |
| EP | 0949704 | 4/1999 |
| EP | 0955686 | 5/1999 |
| GB | 2336712 | 10/1999 |
| WO | WO96/37005 | 11/1996 |
| WO | WO 96/37005 | * 11/1996 |

OTHER PUBLICATIONS

"Electrically Conducting Polymers: Science and Technolgy", Arthur J. Epstein, MRS Bulletin/Jun. 1997 pp. 16-23.*
"Cathode Electrodeposition", A Journal of Coatings Technology Reprint, M. Wimser et al. pp. 35-44, May 1982.*
European Search Report mailed Aug. 4, 2005, 3 pages.

* cited by examiner

*Primary Examiner* — Tracy Dove
(74) *Attorney, Agent, or Firm* — Reising Ethington P.C.

(57) ABSTRACT

A PEM fuel cell having electrical contact elements comprising a corrosion-susceptible substrate metal coated with an electrically conductive, corrosion-resistant polymer containing a plurality of electrically conductive, corrosion-resistant filler particles. The substrate may have an oxidizable metal first layer (e.g., stainless steel) underlying the polymer coating.

8 Claims, 3 Drawing Sheets

CORROSION RESISTANT PEM FUEL CELL

Matter enclosed in heavy brackets [ ] appears in the original patent but forms no part of this reissue specification; matter printed in italics indicates the additions made by reissue.

The Government of the United States of America has rights in this invention pursuant to contract No. DE-AC02-90CH10435 awarded by the United States Department of Energy.

TECHNICAL FIELD

This invention relates to PEM fuel cells, and more particularly to corrosion-resistant electrical contact elements therefor.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, very finely divided catalytic particles supported on the internal and external surfaces of the carbon particles, and proton conductive material intermingled with the catalytic and carbon particles. One such membrane-electrode-assembly and fuel cell is described in U.S. Pat. No. 5,272,017 issued Dec. 21, 1993 and assigned to the assignee of the present invention. The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar plate or septum. The septum or bipolar plate has two working faces, one confronting the anode of one cell and the other confronting the cathode on the next adjacent cell in the stack, and electrically conducts current between the adjacent cells. Contact elements at the ends of the stack contact only the end cells and are referred to as end plates.

In an $H_2$-$O_2$/air PEM fuel cell environment, the bipolar plates and other contact elements (e.g., end plates) are in constant contact with highly acidic solutions (pH 3-5) containing $F^-$, [$SO_4^{--}$,] *$SO_4^{--}$*, $SO_3^-$, $HSO_4^-$, [$CO_3^{--}$,] *$CO_3^{--}$*, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to super atmospheric hydrogen. Hence, contact elements made from metal must be resistant to acids, oxidation, and hydrogen embrittlement in the fuel cell environment. As few metals exist that meet this criteria, contact elements have often been fabricated from large pieces of graphite which is corrosion-resistant, and electrically conductive in the PEM fuel cell environment. However, graphite is quite fragile, and quite porous making it extremely difficult to make very thin gas impervious plates therefrom.

Lightweight metals such as aluminum and titanium and their alloys have also been proposed for use in making fuel cell contact elements. Such metals are more conductive than graphite, and can be formed into very thin plates. Unfortunately, such light weight metals are susceptible to corrosion in the hostile PEM fuel cell environment, and contact elements made therefrom either dissolve (e.g., in the case of aluminum), or form highly electronically resistive, passivating oxide films on their surface (e.g., in the case of titanium or stainless steel) that increases the internal resistance of the fuel cell and reduces its performance. To address this problem it has been proposed to coat the lightweight metal contact elements with a layer of metal or metal compound which is both electrically conductive and corrosion resistant to thereby protect the underlying metal. See for example, Li et al U.S. Pat. No. 5,624,769, which is assigned to the assignee of the present invention, and discloses a light metal core, a stainless steel passivating layer atop the core, and a layer of titanium nitride (TiN) atop the stainless steel layer.

SUMMARY OF THE INVENTION

The present invention comprehends a PEM fuel cell having at least one cell comprising a pair of opposite polarity electrodes, a membrane electrolyte interjacent the electrodes for conducting ions therebetween, and an electrically conductive contact element confronting at least one of the electrodes. The contact element has a working face that serves to conduct electrical current from that electrode. The contact element comprises a corrosion-susceptible metal substrate, having an electrically conductive, corrosion-resistant, protective polymer coating on the working face to protect the substrate from the corrosive environment of the fuel cell. By "corrosion susceptible metal" is meant a metal that is either dissolved by, or oxidized/passivated by, the cell's environment. An oxidizable metal layer may cover a dissolvable metal substrate, and underlie the conductive polymer layer.

More specifically, the protective coatings of the present invention comprises a plurality of electrically conductive, corrosion-proof (i.e., oxidation-resistant and acid-resistant) filler particles dispersed throughout a matrix of an acid-resistant, water-insoluble, oxidation resistant polymer that binds the particles together and holds them on the surface of the metal substrate. The coating contains sufficient filler particles to produce a resistivity no greater than about 50 ohm-cm, and has a thickness between about 5 microns and about 75 microns depending on the composition, resistivity and integrity of the coating. Thinner coatings (i.e., about 15-25 microns) are preferred for minimizing the IR drop through the stack. Impervious protective coatings are used directly on metals that are dissolvable by the system acids. Pervious coatings may be used on metals that are only oxidized/passivated, or on dissolvable metals covered with a layer of oxidizable/passivatable metal.

Preferably, the conductive particles comprise carbon or graphite having a particle size less than about 50 microns. Most preferably, the particles comprise a mixture of graphite with smaller carbon black particles (i.e., about 0.5-1.5 microns) that fill the interstices between larger graphite particles (i.e., about 5-20 microns) to optimize the packing density of said particles for improved conductivity. Other oxidation-resistant and acid-resistant conductive particles may be substituted for the small carbon black particles. The polymer matrix comprises any water-insoluble polymer that (1) is resistant to acids and oxidation, (2) can be readily coated or formed into thin films, and (3) can withstand the operating temperatures of the fuel cell (i.e. up to about 120° C.

The coating may be applied in a variety of ways including: (1) laminating a preformed discrete film of the coating material onto the working face(s) of the conductive element; or (2) applying (e.g. spraying, brushing, doctor blading etc.) a precursor layer of the coating material (i.e. a slurry of conductive particles in solvated polymer) to the working face followed by drying and curing the film, or (3) electrophoretically depositing the coating onto the working face(s).

BRIEF DESCRIPTION OF THE DRAWINGS

The invention will better be understood when considered in the light of the following detailed description of certain specific embodiments thereof which is given hereafter in conjunction with the several figures in which.

DESCRIPTION OF THE PREFERRED EMBODIMENT

Figure 1:
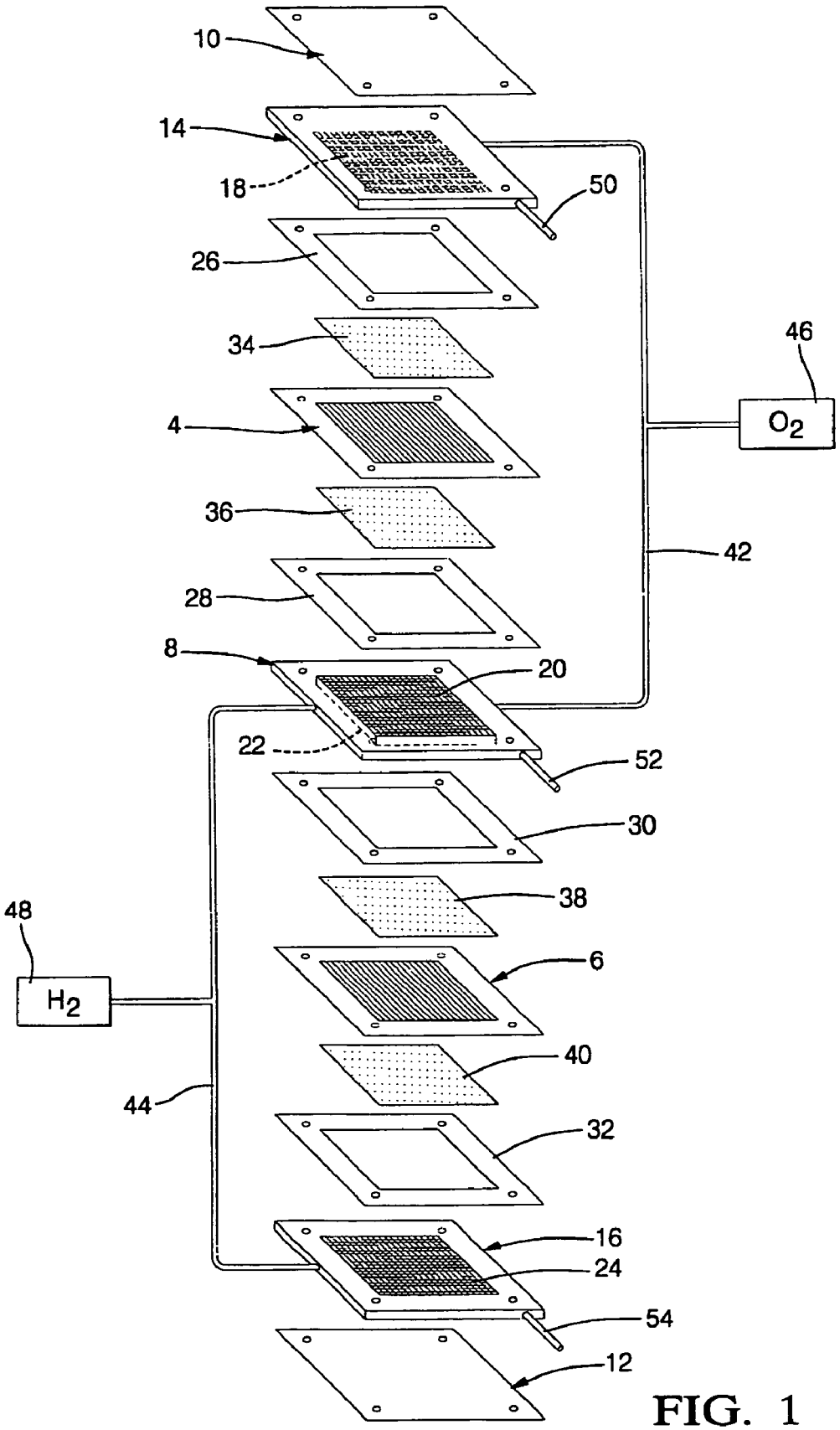
FIG. 1 is a schematic, exploded, isometric, illustration of a liquid-cooled PEM fuel cell stack (only two cells shown)

FIG. 1 depicts a two cell, bipolar PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and end contact elements 14 and 16. The end contact elements 14 and 16, as well as both working faces of the bipolar plate 8, contain a plurality of grooves or channels 18, 20, 22, and 24 for distributing fuel and oxidant gases (i.e., $H_2$ & $O_2$) to the MEAs 4 and 6. Nonconductive gaskets 26, 28, 30, and 32 provide seals and electrical insulation between the several components of the fuel cell stack. Gas permeable carbon/graphite diffusion papers 34, 36, 38 and 40 press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing (not shown) for both the $H_2$ and $O_2$/air sides of the MEAs will also be provided. Additional plumbing 50, 52 and 54 is provided for supplying liquid coolant to the bipolar plate 8 and end plates 14 and 16. Appropriate plumbing for exhausting coolant from the plate 8 and end plates 14 and 16 is also provided, but not shown.

Figure 2:
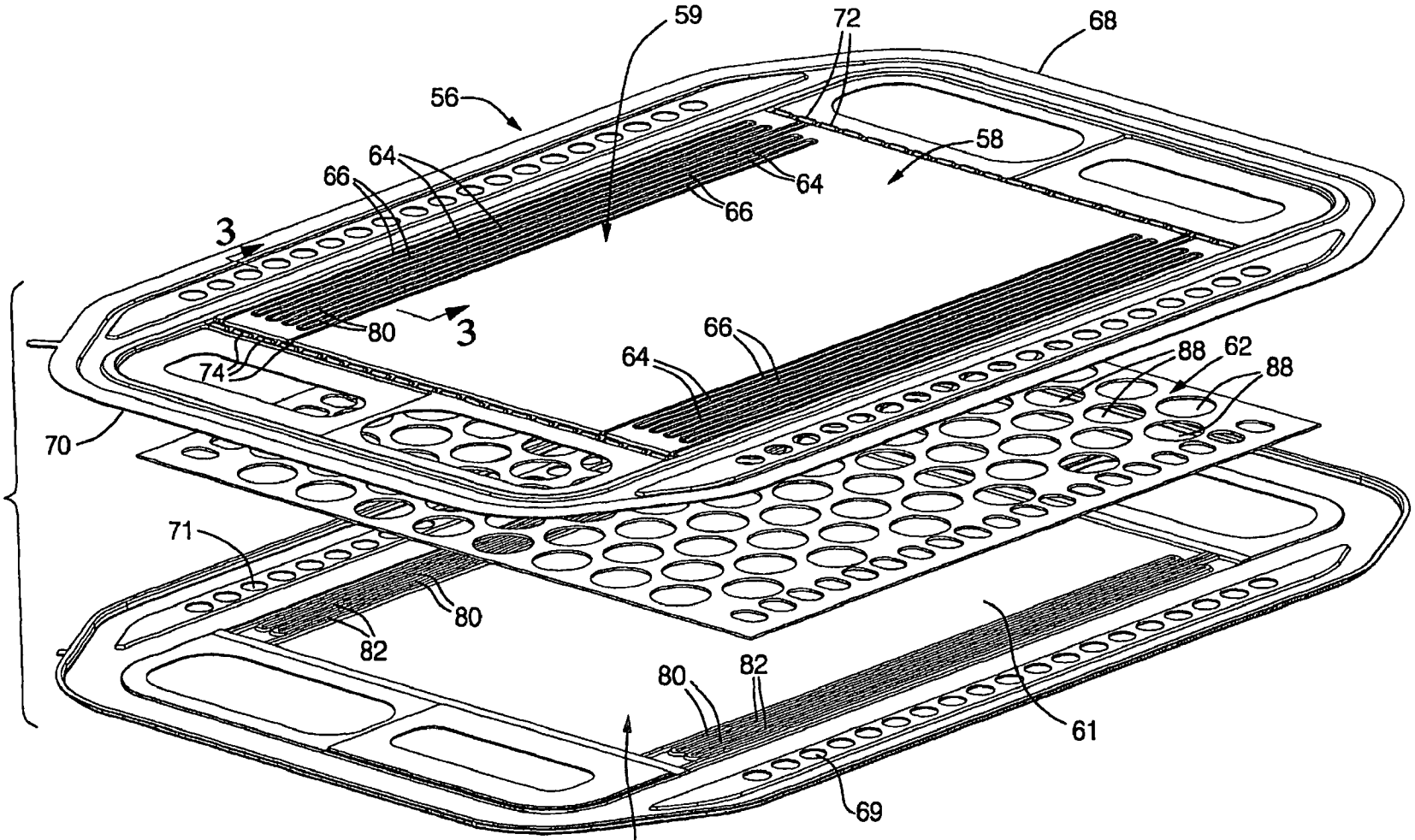
FIG. 2 is an exploded, isometric view of a bipolar plate useful with PEM fuel cell stacks like that illustrated in FIG. 1.
Figure 3:
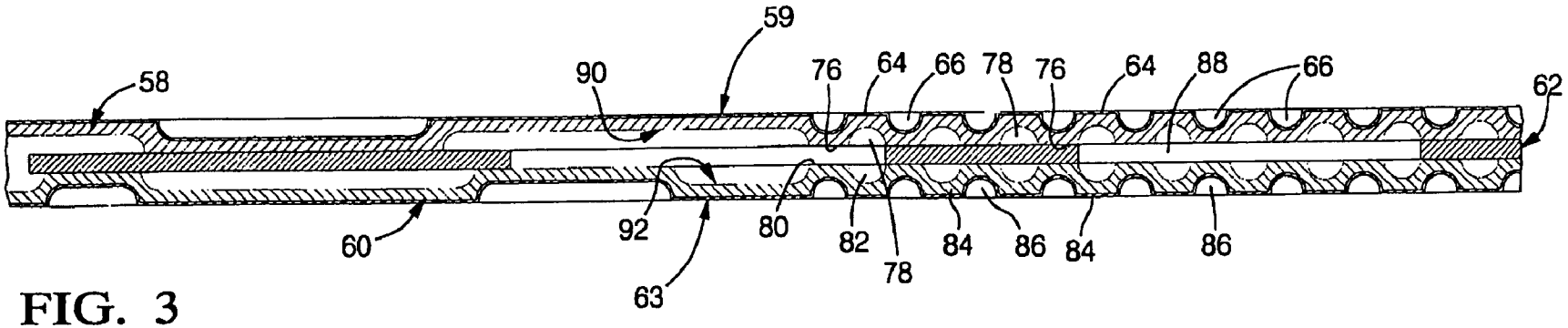
FIG. 3 is a sectioned view in the direction 3-3 of FIG. 2.
Figure 5:
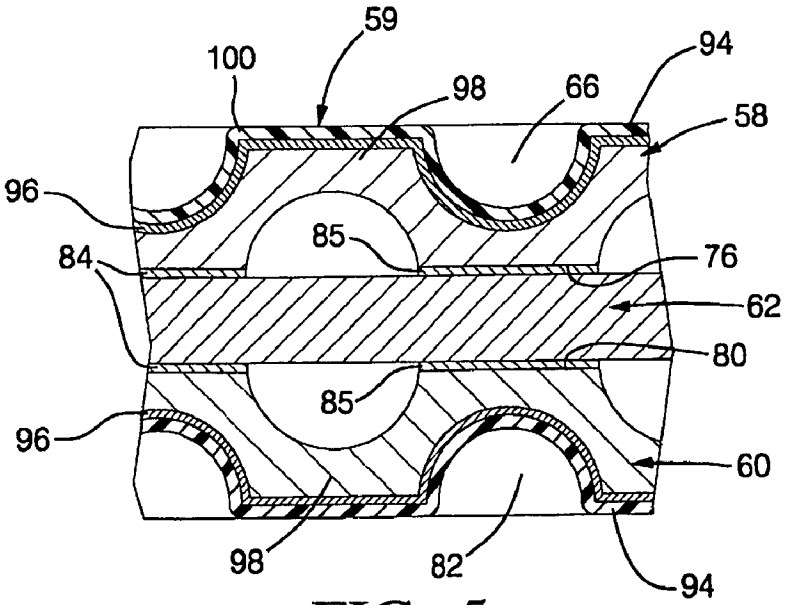
FIGS. 4 and 5 are magnified portions of the bipolar plate of FIG. 3.

FIG. 2 is an isometric, exploded view of a bipolar plate 56 comprising a first exterior metal sheet 58, a second exterior metal sheet 60, and an interior spacer metal sheet 62 inteijacent the first metal sheet 58 and the second metal sheet 60. The exterior metal sheets 58 and 60 are made as thin as possible (e.g., about 0.002-0.02 inches thick), may be formed by stamping, by photo etching (i.e., through a photolithographic mask) or any other conventional process for shaping sheet metal. The external sheet 58 has a first working face 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers 36 or 38 (see FIG. 1) which, in turn, press against the MEAs 4 and 6 respectively. For drafting simplicity, FIG. 2 depicts only two arrays of lands and grooves. In reality, the lands and grooves will cover the entire external faces of the metal sheets 58 and 60 that engage the carbon/graphite papers 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material.

Metal sheet 60 is similar to sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working face 63 having a plurality of lands 84 thereon defining a plurality of grooves 86 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively.

Figure 4:
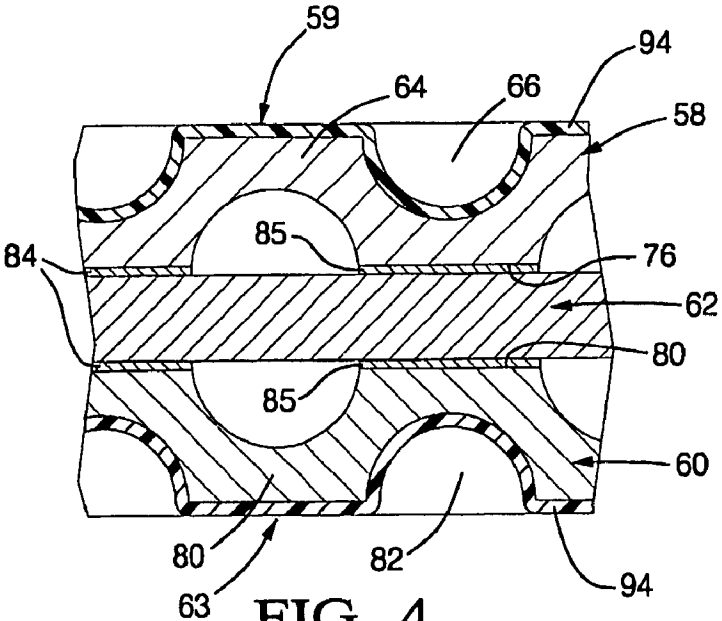

FIG. 4 is a magnified view of a portion of FIG. 3 and shows the ridges 76 on the first sheet 58, and the ridges 80 on the second sheet 60 bonded (e.g. by brazement 85) to the spacer sheet 62.

In accordance with the present invention, and as best shown in FIG. 4, the working faces 59 and 63 of the bipolar plate are covered with an electrically conductive, [oxidation resistant] *oxidation-resistant*, and acid-resistant protective coating 94 having a resistivity less than about 50 ohm-cm, and comprising a plurality of oxidation-resistant, acid-insoluble, conductive particles (i.e. less than about 50 microns) dispersed throughout an acid-resistant, oxidation-resistant polymer matrix. Preferably, the conductive filler particles are selected from the group consisting of gold, platinum, graphite, carbon, nickel, conductive metal borides, nitrides and carbides (e.g. titanium nitride, titanium carbide, titanium diboride), titanium alloyed with chromium and/or nickel, palladium, niobium, rhodium, rare earth metals, and other nobel metals. Most preferably, the particles will comprise carbon or graphite (i.e. hexagonally crystallized carbon). The particles comprise varying weight percentages of the coating depending on the density and conductivity of the particles (i.e., particles having a high conductivity and low density can be used in lower weight percentages). Carbon/graphite containing coatings will typically contain 25 percent by weight carbon/graphite particles. The polymer matrix comprises any water-insoluble polymer that can be formed into a thin adherent film and that can withstand the hostile oxidative and acidic environment of the fuel cell. Hence, such polymers, as epoxies, silicones, polyamide-imides, polyether-imides, polyphenols, fluro-elastomers (e.g., polyvinylidene flouride), polyesters, phenoxy-phenolics, epoxide-phenolics, acrylics, and urethanes, [inter alia] *inter alia* are seen to be useful with the present invention. Cross-linked polymers are preferred for producing impermeable coatings.

The substrate metal forming the contact element comprises a corrosion-susceptible metal such as (1) aluminum which is dissolvable by the acids formed in the cell, or (2) titanium or stainless steel which are oxidized/passivated by the formation of oxide layers on their surfaces. In accordance with one embodiment of the invention, the conductive polymer coating is applied directly to the substrate metal and allowed to dry/cure thereon. According to another embodiment of the invention, the substrate metal comprises an acid soluble metal (e.g., Al) that is covered with an oxidizable metal (e.g., stainless steel) before the electrically conductive polymer topcoat is applied.

The coating may be applied in a variety of ways, e.g., (1) electrophoretic deposition, (2) brushing, spraying or spreading, or (3) laminating. Electrophoretically deposited coatings are particularly advantageous because they can be quickly deposited in an automated process with little waste, and can be deposited substantially uniformly onto substrates having complex and recessed surfaces like those used to form the reactant flow fields on the working face(s) of the contact elements. Electrophoretic deposition is a well-known process useful to coat a variety of conductive substrates such as automobile and truck bodies. Electrophoretic deposition technology is discussed in a variety of publications including "Cathodic Electrodeposition", Journal of Coatings Technology, Volume 54, No. 688, pages 35-44 (May 1982). Briefly, in electrophoretic deposition processes, a direct current is passed through a suspension of the conductive particles in an aqueous solution of a charged acid-soluble polymer. Under the influence of the applied current, the polymer migrates to, and precipitates upon, a conductive substrate of opposing charge, and carries with it the conductive particles. When cross-linkable polymers are used, the suspension also includes a catalyst for promoting the cross-linking. Cathodic and anodic electrophoretic processes are both known. Cathodically deposited coatings are preferred for fuel cell applications, and are deposited by a process wherein positively charged polymer is deposited onto a negatively charged substrate. Anodically deposited coatings are less desirable since they tend to dissolve some of the substrate metal and contaminate the coating therewith. In cathodic electrophoretic coating, the passage of electrical current causes the water to electrolyze forming hydroxyl ions at the cathode and establishing an alkaline diffusion layer contiguous therewith. The alkalinity of the diffusion layer is proportional to the cathode current density. Under the influence of the applied voltage, the positively charged polymer migrates to the cathode and into the alkaline diffusion layer where the hydroxyl ions react with the acid-solubilized polymer and cause the polymer to precipitate onto the cathodic substrate. The conductive filler particles become trapped in the precipitate and co-deposit onto the cathodic substrate. Cathodic epoxies, acrylics, urethanes and polyesters are useful with this method of depositing the coating as well as other polymers such as those disclosed in the "Cathodic Electrodeposition" publication (supra), and in Reuter et al. U.S. Pat. No. 5,728,283 and the references cited therein. Subsequent baking of the coated contact element cures and densities the coating.

According to another embodiment of the invention, the coating is first formed as a discrete film (e.g. by solvent casting, extrusion etc.), and then laminated onto the working surface of the contact element, e.g., by hot rolling. This technique will preferably be used to make laminated sheet stock from which the contact elements are subsequently formed, e.g. as by stamping. In this embodiment, the discrete film will preferably contain a plasticizer to improve handling of the film and to provide a coating layer atop the substrate that is supple enough so that it can be readily shaped, (e.g. stamped) without tearing or disrupting the film when the contact element is formed as by stamping. To insure adherence of the coating to the substrate, the surface of the substrate to which the film is applied is (1) cleaned of all undesirable surface films (e.g., oil), (2) oxides are removed by acid etching, and (3), most preferably, roughened or abraded to roughen the surface for anchoring the film thereto. Fluroelastomers such as polyvinyladiene diflouride or the like are useful with this embodiment, and may be used with conventional plasticizers such as dibutyl phthalate.

According to another embodiment of the invention, the electrically conductive polymer film is applied to the working face of the substrate by spraying, brushing or spreading (e.g. with a doctor blade). In this embodiment, a precursor of the coating is formed by dissolving the polymer in a suitable solvent, mixing the conductive filler particles with the dissolved polymer and applying it as a wet slurry atop the substrate. The wet coating is then dried (i.e. the solvent removed) and cured as needed (e.g., for thermosets). The conductive particles adhere to the substrate by means of the solvent-free polymer. A preferred polymer useful with this embodiment comprises a polyamide-imide thermosetting polymer. The polyamide-imide is dissolved in a solvent comprising a mixture of N-methylpyrrolidone, propylene glycol and methyl ether acetate. To this solution is added about 21% to about 23% by weight of a mixture of graphite and carbon black particles wherein the graphite particles range in size from about 5 microns to about 20 microns and the carbon black particles range in size from about 0.5 micron to about 1.5 microns with the smaller carbon black particles serving to fill the voids between the larger graphite particles and thereby increase the conductivity of the coating compared to all-graphite coatings. The mix is applied to the substrate, dried and cured to provide 15-30 micron thick coatings (preferably about 17 microns) having a carbon-graphite content of about 38% by weight. It may be cured slowly at low temperatures (i.e. <400° F.), or more quickly in a two step process wherein the solvent is first removed by heating for ten minutes at about 300° F.-350° F. (i.e., dried) followed by higher temperature heating (500° F.-750° F.) for various times ranging from about ½ min to about 15 min (depending on the temperature used) to cure the polymer.

Some coatings may be pervious to the cell's hostile environment. [Previous] *Pervious* coatings are used directly only on oxidizable metals (e.g., titanium or stainless steel) and not directly on metals that are susceptible to dissolution in the fuel cell environment (e.g., aluminum). Pervious coatings could however be used on dissolvable metal substrates (e.g., Al) which have first been coated or clad with an oxidizable/passivating metal layer (e.g., titanium or stainless steel). When pervious coatings are used on an oxidizable/passivating substrate or coating, oxides will form at the sites (i.e., micropores) where the coating is pervious, but not at sites where the polymer engages the substrate metal. As a result, only a small portion of the surface is oxidized/passivated ([i.e.] *i.e.,* at the micropores in the coating) resulting in very little increase in electrical resistance attributable to the oxide formation.

According to one embodiment of the invention, the electrically conductive polymer coating is applied to an acid-dissolvable substrate metal (e.g., Al) which had previously been coated with a layer of oxidizable/passivating metal such as stainless steel. In this regard, a barrier/protective layer 96 of a metal that forms a low resistance, passivating oxide film is deposited onto the substrate 98, and is covered with a topcoat of conductive polymer 54 in accordance with the present invention. Stainless steels rich in chromium (i.e., at least 16% by weight), nickel (i.e., at least 20% by weight), and molybdenum (i.e., at least 3% by weight) are seen to be excellent such barrier/protective layers 96 as they form a dense oxide layer at the sites of the micropores in the polymer coating which inhibits further corrosion, but which does not significantly increase the fuel cell's internal resistance. One such stainless steel for this purpose is commercially available from the Rolled Alloy Company as alloy Al-6XN, and contains 23±2% by weight chromium, 21±2% by weight nickel, and 6±2% by weight molybdenum. The barrier/protective stainless steel layer is preferably deposited onto the metal substrate using conventional physical vapor deposition (PVD) techniques (e.g., sputtering), or chemical vapor deposition (CVD) techniques known to those skilled in [these] *the* art. Alternatively, electrolessly deposited nickel-phosphorous alloys appear to have good potential as a substitute for the stainless steel in that they readily form a passivating film when exposed to the fuel cell environment which provides a barrier to further oxidation/corrosion of the underlying coating.

While the invention has been described in terms of specific embodiments thereof it is not intended to be limited thereto but rather only to the extent set forth hereafter in the claims which follow.

What is claimed is:

1. In a PEM fuel cell having at least one cell comprising a pair of opposite polarity electrodes, a membrane electrolyte [intedacent] *interjacent* said electrodes for conducting ions therebetween, and an electrically conductive contact element having a working face confronting at least one of said [electrodessfor] *electrodes for* conducting electrical current from said one electrode, the improvement comprising: said contact element comprising a corrosion-susceptible metal substrate and an electrically conductive, corrosion-resistant protective coating on said face to protect said substrate from the corrosive environment of said fuel cell, said protective coating comprising a mixture of electrically conductive particles dispersed throughout an oxidation-resistant and acid-resistant, water-insoluble polymeric matrix and having a resistivity *no* greater than about 50 ohm-cm, said mixture comprising graphite particles having a first particle size and other electrically conductive particles selected from the group consisting of gold, platinum, nickel, palladium, rhodium, niobium, titanium carbide, titanium nitride, titanium diboride, chromium-alloyed titanium, nickel-alloyed titanium, rare earth metals and carbon, said other particles having a second particle size less than said first particle size to enhance the packing density of said particles.

2. A fuel cell according to claim 1 wherein said carbon comprises carbon black.

3. A fuel cell according to claim 1 wherein said coating is electrophoretically deposited onto said substrate from a suspension of said particles in an aqueous solution of acid-solubilized polymer.

4. A fuel cell according to claim 1 wherein a discrete film of said coating is laminated onto said substrate to form said electrically conductive contact element.

5. A fuel cell according to claim 1 wherein a precursor of said coating is deposited onto said substrate from a solution thereof, dried and cured to form said coating.

6. A fuel cell according to claim 1 wherein said substrate comprises a first acid-soluble metal underlying a second acid-insoluble, passivating metal layer susceptible to oxidation in said environment.

7. A fuel cell according to claim 1 wherein said polymer matrix is selected from the group consisting of epoxies, silicones, polyamide-imides, polyether-imides, polyphenols, fluro-elastomers, polyesters, phenoxy-phenolics, epoxide-phenolics, acrylics and urethanes.

8. In a PEM fuel cell having at least one cell comprising a pair of opposite polarity electrodes, a membrane electrolyte [intedjacent] *interjacent* said electrodes for conducting ions therebetween, and an electrically conductive contact element having a working face confronting at least one of said electrodes for conducting electrical current from said one electrode, the improvement comprising: said contact element comprising a corrosion-susceptible metal substrate and an electrically conductive, corrosion-resistant protective coating on said face to protect said substrate from the corrosive environment of said fuel cell, said protective coating comprising a plurality of electrically conductive particles dispersed throughout an oxidation-resistant and acid-resistant, water-insoluble polymeric matrix and having a resistivity no greater than about 50 ohm-cm, said substrate comprising a first acid-soluble metal underlying a second acid-insoluble, passivating layer susceptible to oxidation in said environment.

* * * * *